(12) United States Patent
Balupari et al.

(10) Patent No.: US 8,677,487 B2
(45) Date of Patent: Mar. 18, 2014

(54) SYSTEM AND METHOD FOR DETECTING A MALICIOUS COMMAND AND CONTROL CHANNEL

(75) Inventors: Ravindra Balupari, Hyderabad (IN); Vinay Mahadik, Milpitas, CA (US); Bharath Madhusudan, Sunnyvale, CA (US); Chintan H. Shah, Gujarat (IN)

(73) Assignee: McAfee, Inc., Santa Clara, CA (US)

( * ) Notice: Subject to any disclaimer, the term of this patent is extended or adjusted under 35 U.S.C. 154(b) by 8 days.

(21) Appl. No.: 13/276,244

(22) Filed: Oct. 18, 2011

(65) Prior Publication Data

US 2013/0097699 A1  Apr. 18, 2013

(51) Int. Cl.
*H04L 29/06* (2006.01)

(52) U.S. Cl.
USPC ............................................. 726/23; 726/22

(58) Field of Classification Search
USPC ....................................... 726/22, 23
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 7,506,155 B1 | 3/2009 | Stewart et al. | |
| 2005/0044406 A1 | 2/2005 | Stute | |
| 2007/0107059 A1* | 5/2007 | Chasin et al. ................... 726/23 |
| 2008/0010166 A1* | 1/2008 | Yang et al. ....................... 705/26 |
| 2008/0028463 A1* | 1/2008 | Dagon et al. ..................... 726/22 |
| 2009/0094311 A1 | 4/2009 | Awadallah et al. | |
| 2010/0251370 A1* | 9/2010 | Sun et al. ......................... 726/23 |
| 2010/0281539 A1 | 11/2010 | Burns et al. | |
| 2011/0153811 A1* | 6/2011 | Jeong et al. ..................... 709/224 |

FOREIGN PATENT DOCUMENTS

KR  10-2010-0083681 A  7/2010
WO  2007/055770 A2  5/2007

OTHER PUBLICATIONS

Lei Zhen-ming, et al. "Analysis on the Time-Domain Characteristics of Botnets Control Traffic." The Journal of China Universities of Posts and Telecommunications 18.(n.d.): 106-113. ScienceDirect. Web. Oct. 24, 2013.*

(Continued)

*Primary Examiner* — Amare F Tabor
*Assistant Examiner* — Michael Guirguis
(74) *Attorney, Agent, or Firm* — Patent Capital Group

(57) ABSTRACT

A method is provided in one example embodiment that includes detecting repetitive connections from a source node to a destination node, calculating a score for the source node based on the connections, and taking a policy action if the score exceeds a threshold score. In more particular embodiments, the repetitive connections use a hypertext transfer protocol and may include connections to a small number of unique domains, connections to small number of unique resources associated with the destination node, and/or a large number of connections to a resource in a domain. Moreover, heuristics may be used to score the source node and identify behavior indicative of a threat, such as a bot or other malware.

23 Claims, 5 Drawing Sheets

(56) References Cited

OTHER PUBLICATIONS

Advanced Persistent Threat, Eric Cole, Jun. 21, 2010, retrieved and printed on Oct. 18, 2011 from http://blogs.mcafee.com/corporate/cto/advanced-persistent-threat-apt, 3 pages.

SBotminer: Large Scale Search Bot Detection, Fang Yu, et al., copyright 2010, retrieved and printed on Oct. 18, 2011 from http://research.microsoft.com/pubs/115681/wsdm-yu.pdf, 10 pages.

The New Era of Botnets, Zheng Bu, et al., White Paper, retrieved and printed on Oct. 18, 2011 from http://www.mcafee.com/us/resources/white-papers/wp-new-era-of-botnets.pdf, 14 pages.

International Search Report and written opinion received for PCT Application No. PCT/US2012/058045, mailed on Jan. 31, 2013, 10 pages.

* cited by examiner

US 8,677,487 B2

SYSTEM AND METHOD FOR DETECTING A MALICIOUS COMMAND AND CONTROL CHANNEL

TECHNICAL FIELD

This specification relates in general to network security, and more particularly, to a system and method for detecting a malicious command and control channel.

BACKGROUND

The field of network security has become increasingly important in today's society. The Internet has enabled interconnection of different computer networks all over the world. The ability to effectively protect and maintain stable computers and systems, however, presents a significant obstacle for component manufacturers, system designers, and network operators. This obstacle is made even more complicated by the continually evolving array of tactics implemented by malicious operators. If certain types of malicious software can infect a host computer, it may also be able to perform any number of hostile, intrusive, or annoying actions, such as sending out spam or malicious emails from the host computer, stealing sensitive information from a business or individual associated with the host computer, propagating to other host computers, and/or assisting with distributed denial of service attacks, for example. In addition, the malicious operator can sell or otherwise give access to other malicious operators, thereby escalating the exploitation of the host computers. Hence, significant challenges remain for developing innovative tools to combat tactics that allow malicious operators to exploit computers.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment that includes detecting repetitive connections from a source node to a destination node, calculating a score for the source node based on the connections, and taking a policy action if the score exceeds a threshold score.

In more particular embodiments, the repetitive connections use a hypertext transfer protocol and may include connections to a small number of unique domains, connections to a small number of unique resources associated with the destination node, and/or a large number of connections to a resource in a domain. Moreover, heuristics may be used to score the source node and identify behavior indicative of a threat, such as a bot or other malware.

Example Embodiments

Figure 1:
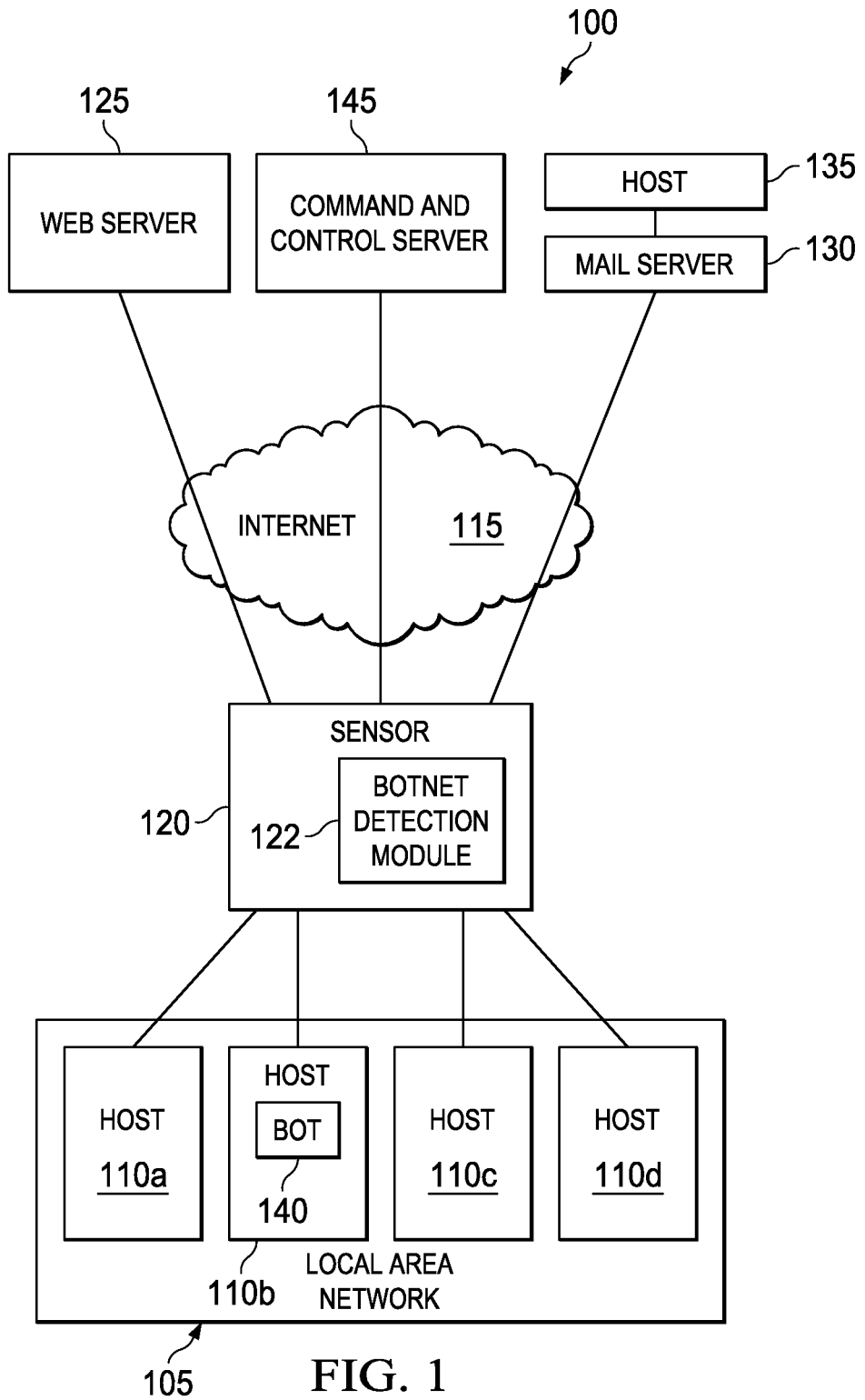
FIG. 1 is a simplified block diagram illustrating an example embodiment of a network environment in which a malicious command and control channel may be detected in accordance with this specification.

Turning to FIG. 1, FIG. 1 is a simplified block diagram of an example embodiment of a network environment 100 in which a malicious command and control channel may be detected. Network environment 100 may include a local area network 105 of nodes, such as hosts 110a-110d, which may be connected to the Internet 115 through a sensor 120 having a botnet detection module 122. A node, in general, is any system, machine, device, network element, client, server, peer, service, application, or other object capable of sending and receiving data on a network. Links between nodes in network environment 100 represent any medium through which two nodes can communicate. The medium may be a tangible medium, such as a wire or fiber optic cable, or an intangible medium, such as a radio wave for wireless communication.

Thus, each of hosts 110a-110d may communicate with each other and with remote nodes connected to Internet 115, such as a web server 125 or a mail server 130. Hosts 110a-110d may also exchange email messages with a remote host 135 through mail server 130, for example. In general, hosts 110a-110d may be any type node capable of running a program and interacting with an operator. In its most common sense, a host generally includes an attached input device and an attached output device, but additionally or alternatively may include interfaces for interacting with an operator remotely. For example, a host may be a desktop computer, a workstation computer, a server, a laptop, a tablet computer (e.g., an iPad), or a mobile telephone (e.g., an iPhone). In this example network environment 100, a host such as host 110b may be compromised by a bot 140, which generally represents any malicious software ("malware") that may be under the control of a remote software, device, machine, or system, such as a command and control (C&C) server 145.

Each of the elements of FIG. 1 may couple to one another through simple network interfaces or through any other suitable connection (wired or wireless), which provides a viable pathway for network communications. Additionally, any one or more of these elements may be combined or removed from the architecture based on particular configuration needs. Network environment 100 may include a configuration capable of transmission control protocol/Internet protocol (TCP/IP) communications for the transmission or reception of packets in a network. Network environment 100 may also operate in conjunction with a user datagram protocol/IP (UDP/IP) or any other suitable protocol where appropriate and based on particular needs.

For purposes of illustrating the techniques of a system and method for detecting a malicious command and control channel, such as may be used by a web-based botnet, it is important to understand certain activities occurring within a given network. The following foundational information may be viewed as a basis from which the present disclosure may be properly explained. Such information is offered earnestly for purposes of explanation only and, accordingly, should not be construed in any way to limit the broad scope of the present disclosure and its potential applications.

Typical network environments used in organizations and by individuals include the ability to communicate electronically with other networks. For example, the Internet may be used to access web pages hosted on remote servers, to send or receive electronic mail (i.e., email) messages, or to exchange files. However, new tactics for interfering with normal operations and gaining access to confidential information continue to emerge. Threats include any activity capable of interfering with the normal operation of a computer or network through unauthorized access to computers, networks, and/or data, unauthorized destruction, disclosure, and/or modification of data, and/or denial of service.

Botnets in particular represent an increasing threat to computer security. In many cases they employ sophisticated attack schemes that include a combination of well-known and new vulnerabilities. Botnets generally use a client-server architecture where a type of malicious software (i.e., a bot) is placed on a host computer and communicates with a command and control server, which may be controlled by a botnet operator. Usually, a botnet is composed of a large number of bots controlled by the operator using a command and control protocol through various channels, including Internet Relay Chat (IRC) and peer-to-peer (P2P) communication. The bot may receive commands from the command and control server to perform particular malicious activities and, accordingly, may execute such commands. The bot may also send any results or pilfered information back to the command and control server.

Botnet attacks generally follow the same lifecycle. First, a host (e.g., a desktop computer) may be compromised by malware. "Malware" is commonly used as a label for any hostile, intrusive, or annoying software such as a computer virus, Trojan, worm, bot, spyware, adware, etc., but may also include other malicious software. The malware may subvert a compromised, giving a bot operator control over it. The bot operator may then use such a computer for malicious activity, such as a denial-of-service attack. In addition to receiving commands to perform malicious activities, a bot also typically includes one or more propagation vectors that enable it to spread within an organization's network or across other networks to other organizations or individuals. Common propagation vectors include exploiting known vulnerabilities on hosts within the local network and sending malicious emails having a malicious program attached or providing malicious links within the emails.

Existing firewall and network intrusion prevention technologies are often deficient for recognizing and containing many botnets. Bots are often designed to initiate communication with a command and control server and to masquerade as normal web browser traffic. Modern botnets, including advanced persistent threats (APTs), may leverage steganographic techniques to hide in plain sight, such as using a command and control protocol that makes the bot appear to be making normal network connections to a web server. For example, a bot may use a port typically used to communicate with a web server. These communications can be very difficult for administrators to distinguish from legitimate network traffic. Such bots, therefore, may not be detected by existing technologies without performing more detailed packet inspection of the web traffic. Moreover, once a bot is discovered, the botnet operator may simply find another way to masquerade network traffic by the bot to continue to present as normal web traffic. More recently, botnet operators have also crafted bots to use encryption protocols such as, for example, secure socket layer (SSL), thereby encrypting malicious network traffic. Such encrypted traffic may use a Hypertext Transfer Protocol Secure (HTTPS) port such that only the endpoints involved in the encrypted session can decrypt the data. Thus, existing firewalls and other network intrusion prevention technologies are unable to perform any meaningful inspection of the web traffic. Consequently, bots continue to infect host computers within networks.

Some reputation systems can also offer a viable defense to particular botnets. In general, a reputation system monitors activity and assigns a reputation value or score based on past behavior. The reputation value may denote different levels of trustworthiness on the spectrum from benign to malicious. For example, a connection reputation value (e.g., minimal risk, unverified, high risk, etc.) may be computed for a network address based on network connections made with the address or email originating from the address, where "network address" is used in a broad sense to include any form of addressing a node or resource, including a media access control (MAC) address, IP address, or domain name, for example. Connection reputation systems may be used to reject email or network connections with network addresses having an unacceptable connection reputation, such as one that indicates an IP address is known or likely to be associated with malicious activity. Other reputation systems can block activity of applications having hashes known or likely to be associated with malicious activity.

However, connection reputation lookups are generally only effective for providing a defense to malware or botnets with some history, and may not be able to provide an effective defense to a zero-day threat. For example, a domain name with little or no history may be created by registering the domain name with a registrar authorized by the Internet Corporation for Assigned Names and Numbers (ICANN). Thus, a bot operator may register a new, seemingly innocuous domain name (e.g., "futbol.com") and use ordinary hypertext transfer protocol (HTTP) connections to exchange information between a bot and a web-based command and control server using the new domain name. Since the domain name is new and likely has no reputation, a reputation system may not be able to distinguish such traffic from legitimate traffic.

Other security technology focused on preventing unauthorized program files from executing on a host computer may have undesirable side effects for end users or employees of a business or other organizational entity. Network or Information Technology (IT) administrators may be charged with crafting extensive policies relevant to all facets of the business entity to enable employees to obtain software and other electronic data from desirable and trusted network resources. Without extensive policies in place, employees may be prevented from downloading software and other electronic data from network resources that are not specifically authorized, even if such software and other data facilitate legitimate and necessary business activities. In addition, such systems may be so restrictive that if unauthorized software is found on a host computer, any host computer activities may be suspended pending network administrator intervention. For businesses, this type of system may interfere with legitimate and necessary business activities, resulting in worker downtime, lost revenue, significant Information Technology overhead, and the like.

In accordance with embodiments disclosed herein, network environment 100 can overcome these shortcomings (and others) by detecting malicious command and control channels. In particular, network environment 100 may provide behavioral analysis, logic, and heuristics to detect botnets (including APTs) and other threats on the $0^{th}$ day. Moreover, network environment 100 may detect botnets that attempt to hide in plain sight, without any need for signature updates.

In certain embodiments, for example, a sensor (e.g., in a intrusion prevention system, firewall, gateway, etc.) may look for repetitive HTTP connections (even at low/stealth levels)

from a host while the host is idle. A host is presumed to be idle in this context if no operator is actively using the host during a given time period, such as a one-two hour window at night or over a weekend. Once such repetitive HTTP connections are identified, the connections may be heuristically scored and appropriate action may be taken based on policy and a confidence level associated with the score. For example, the host may be quarantined or an alert with an associated confidence level can be sent to an administrator. Embodiments disclosed and described herein can offer a high rate of bot detection for behavior that is difficult for malware developers to circumvent, together with a high confidence level for the detection.

Hosts generating repetitive HTTP connections can be detected while simultaneously ensuring that the host is otherwise idle or asleep to avoid connections created by user activity. A legitimate user (i.e., a person) typically does not open a browser and generate traffic to only a specific file repeatedly while not also connecting to other domains and/or to other files on the same domain. For example, even when visiting a relatively simple web page such as google.com, a browser usually connects to a large number of files in that domain. It is rare for a web site to have just one page with no embedded scripts or images that a user refreshes/reloads repeatedly. Thus, in one embodiment of network environment 100, a host may be identified as having suspicious repetitive connections when the host has connected to a large number of resources X (e.g. X>=10) but the total number of unique domains Y is a small number (e.g. Y<=5), and for at least one of these domains, the total number of unique file paths Z is a small number (e.g. Z<=5). An eight-hour window during which a host is idle may be used to detect even stealth bots, but shorter or longer time windows may be appropriate for some environments.

Additional heuristics may be applied to traffic from such a host having suspicious, repetitive HTTP connections that is otherwise idle or asleep to reduce false-positives and increase confidence of positive detections. For example, a scoring system may be used to indicate low, medium, or high confidence level.

Figure 2:
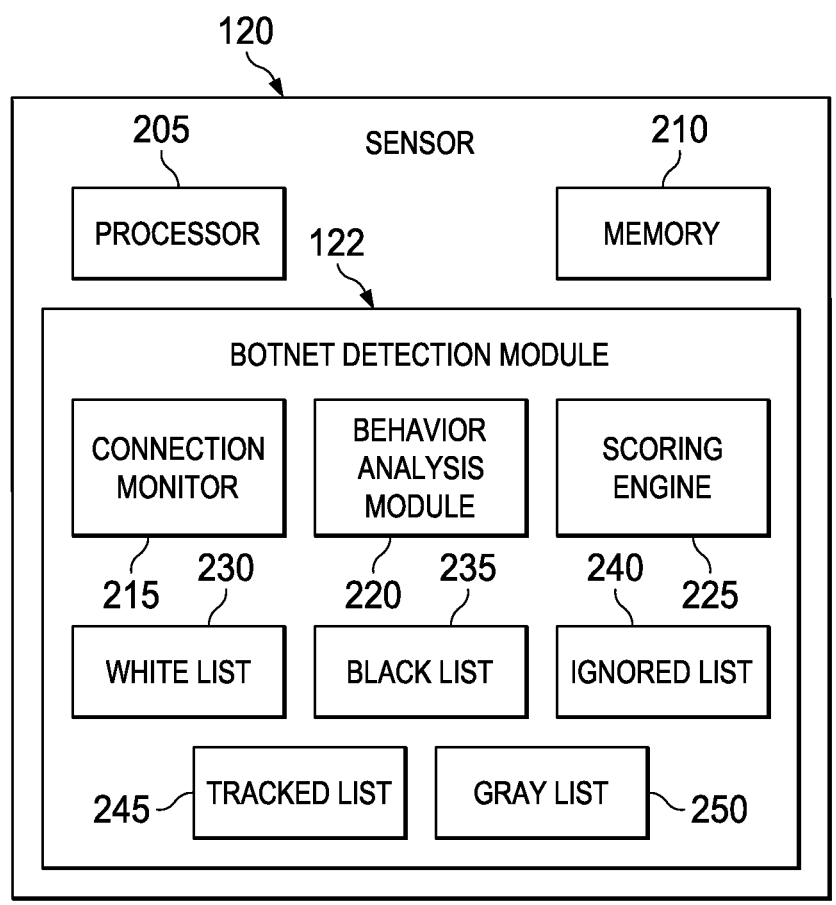
FIG. 2 is a simplified block diagram illustrating additional details that may be associated with the network environment.

Turning to FIG. 2, FIG. 2 is a simplified block diagram illustrating additional details that may be associated with an example embodiment of sensor 120. Sensor 120 may include a processor 205, a memory element 210, and various hardware and/or software elements. More particularly, sensor 120 may include botnet detection module 122, which may provide a connection monitor 215, a behavior analysis module 220, and a scoring engine 225. Botnet detection module 122 may further include various data elements, including a white list 230, a black list 235, an ignored list 240, a tracked list 245, and a gray list 250.

Sensor 120 may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, or in any other suitable component, device, element, or object where appropriate and based on particular needs. Any of the memory items discussed herein (e.g., memory 210) should be construed as being encompassed within the broad term 'memory element.' The information being tracked (e.g., white list 230, black list 235, etc.) or sent by sensor 120 could be provided in any database, register, queue, table, control list, or other storage structure, all of which can be referenced at any suitable timeframe. Any such storage options may be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory media. In some of these instances, memory elements (as shown in FIG. 2) can store data used for the operations described herein. This includes the memory elements being able to store software, logic, code, or processor instructions that are executed to carry out the activities described herein.

A processor can execute any type of instructions associated with the data to achieve the operations detailed herein. In one example, the processors (as shown in FIG. 2) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.' Each of the network elements can also include suitable interfaces for receiving, transmitting, and/or otherwise communicating data or information in a network environment.

In one example implementation, sensor 120 is a network element representative of any network appliance, server, router, switch, gateway, bridge, load-balancer, firewall, intrusion prevention system, processors, modules, or any other suitable device, component, element, or object operable to exchange information in a network environment. A network element may include any suitable hardware, software, components, modules, interfaces, or objects that facilitate the operations thereof. This may be inclusive of appropriate algorithms and communication protocols that allow for the effective exchange of data or information.

In one example implementation, sensor 120 may include software (e.g., botnet detection module 122) to achieve, or to foster, operations as outlined herein. In other embodiments, such operations may be carried out by hardware, implemented externally to these elements, or included in some other network device to achieve the intended functionality. Alternatively, these elements may include software (or reciprocating software) that can coordinate in order to achieve the operations, as outlined herein. In still other embodiments, one or all of these devices may include any suitable algorithms, hardware, software, components, modules, interfaces, or objects that facilitate the operations thereof.

Figure 3:
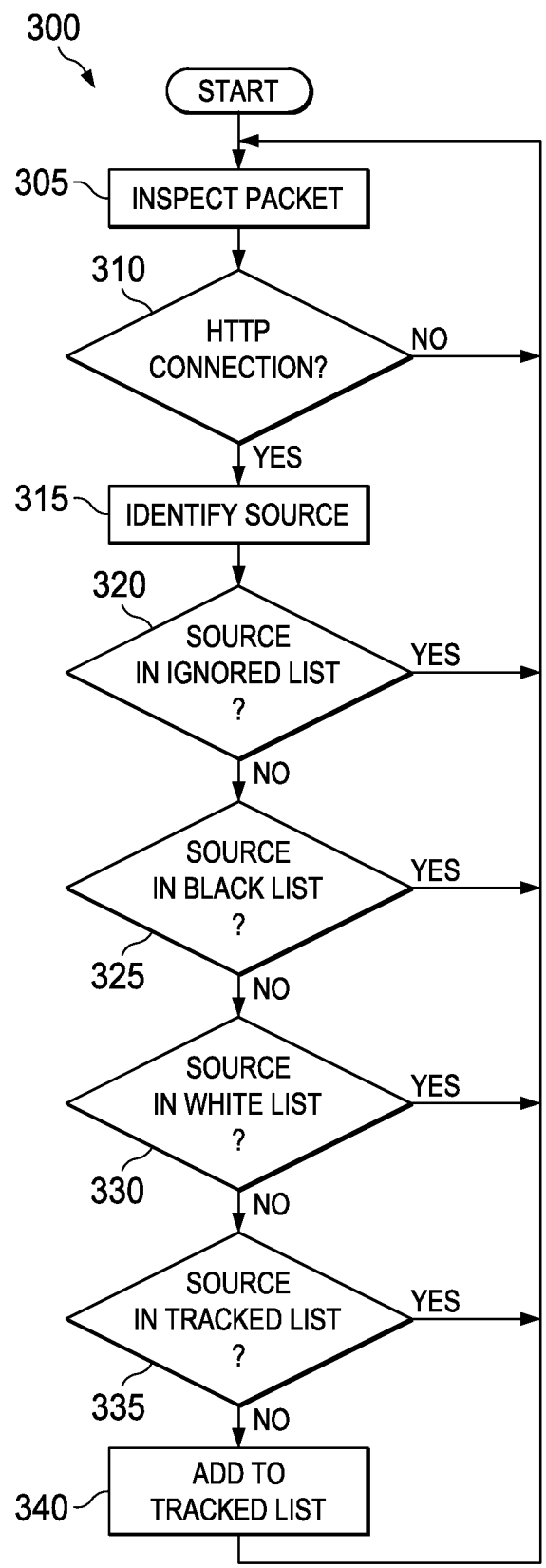
FIG. 3 is a simplified flowchart illustrating potential operations that may be associated with the network environment.

FIG. 3 is a simplified flowchart 300 illustrating potential operations for identifying network connections using a given protocol, which may be associated with example embodiments of network environment 100. In some embodiments, such operations may be implemented by sensor 120 (e.g., botnet detection module, including connection monitor 215, behavior analysis module 220, scoring engine 225, etc.), to identify connections using HTTP.

In general, HTTP facilitates data exchange between a client and a server attached to a network. HTTP, as commonly implemented, is a request/response application-level protocol, which can use a transport layer protocol such as TCP to create a connection and transfer data between two network nodes, such as a client and a server, each having a unique network address. In this context, a "server" may be any node (or software component of a node) in a network that provides a resource to other nodes. A "client" may be any node (or software component of a node) in a network that requests a resource. Thus, a client (also known as a "user agent") can establish a connection to a server (usually on a well-known port) and use the connection to request a resource from the server. The server can monitor the connection and send a response after receiving the request. The response may include the requested resource, an error message, or other information.

Many types of resources are generally available through HTTP, including documents, images, programs, and services. In general, a resource is any object, data, information, service, or other abstract concept that can be identified and accessed over a network connection. A resource can be identified by any string of characters and/or numbers, such as a Uniform Resource Identifier (URI) scheme, for example. A URI may be classified as a locator, a name, or both. A Uniform Resource Name (URN) is one example of a resource identifier that can identify a resource by a unique name within a given namespace, while a Uniform Resource Locator (URL) is an example of a resource identifier that can specify a location of a resource. A URI can also specify a mechanism for retrieving the resource (e.g., a protocol). URI schemes are often designed to work with a particular protocol. A common URL scheme for unambiguously identifying network resources, for example, consists of a service identifier (e.g., "http"), followed by a service source, which may be a host name (or IP address) combined with a path to a resource (e.g., a file or program). The top of the path is generally known as the "root," and a resource at the root is referred to herein as a "root resource." Parameters may also be included in some identifiers, such as an HTTP URL for a program.

As used herein, a "source" includes any client, host, or other node that can initiate a connection with another node through sensor 120. A source's connections or other activity may be tracked in various types of lists, tables, or similar structures to facilitate further operations described herein. For example, a white list (e.g., white list 230) may identify sources that have been determined to be legitimate and safe, while a black list (e.g., black list 235) may identify sources previously determined to be malicious. An ignored list (e.g., ignored list 240) may identify sources that exhibit some suspect connection patterns but also exhibit some activity that is indicative of legitimate activity. A gray list (e.g., gray list 250) may identify sources that exhibit suspect connection patterns or other activity that warrants further behavioral analysis. A tracked list (e.g., tracked list 245) may identify sources exhibiting suspect connection patterns or other activity that are not identified in another list (e.g., not previously identified).

Referring again to FIG. 3, in one example embodiment, connection monitor 215 may monitor and inspect packets at 305. If a packet indicates a connection using a hypertext transfer protocol (HTTP) at 310, the source of the connection may be identified at 315. The source may be compared to an ignored list at 320, a black list at 325, a white list at 330, and a tracked list at 335. If the source is not identified in any of these lists, the source may be added to a tracked list at 340, such as by adding the source's network address. Other information associated with the connection may also be added, such as a URI, URL, URN, network address, host name, or other identifier associated with the destination.

Figure 4:
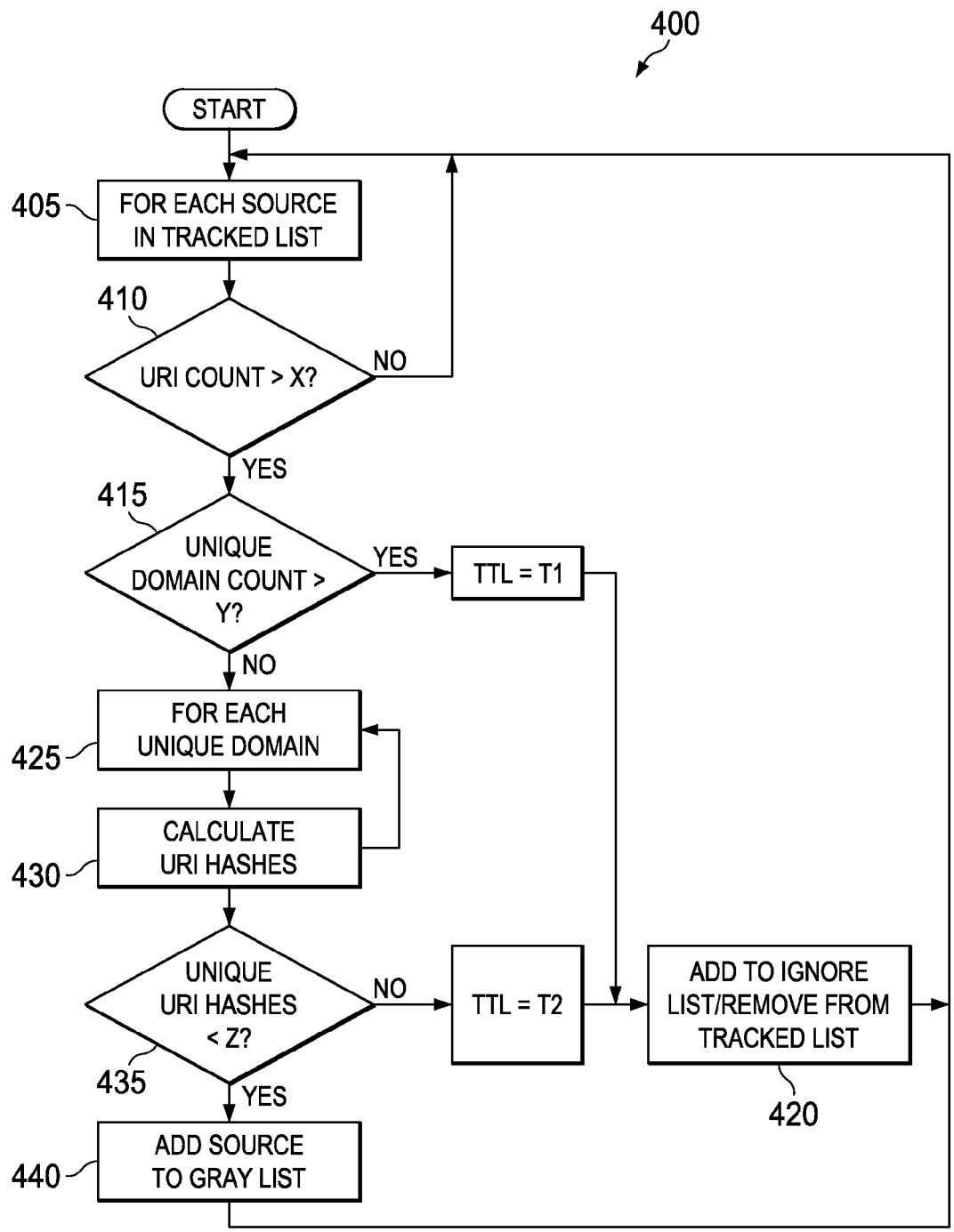
FIG. 4 is a simplified flowchart illustrating additional operations that may be associated with the network environment.

FIG. 4 is a simplified flowchart 400 illustrating potential operations for identifying an idle source that generates repetitive connections using a hypertext transfer protocol without an active user, which may be associated with example embodiments of network environment 100. In some embodiments, such operations may be implemented by sensor 120 (e.g., botnet detection module, including connection monitor 215, behavior analysis module 220, scoring engine 225, etc.).

For each source in a tracked list at 405 (e.g., in tracked list 245), a number of metrics may be examined to identify HTTP connections not generated by a human user. As a threshold matter, the number of connections made by a source can be examined to ensure the source has generated a sufficient amount of traffic. In certain embodiments, the number of connections may be measured by counting the number of resource identifiers (e.g., URIs) requested by the source. However, if the number of resource identifiers (e.g., "URI count") does not exceed a threshold value X at 410, then the activity may not be sufficient to determine with a desired level of confidence whether the source is idle or not. However, if the number of resource identifiers exceeds the threshold value X at 410, then additional metrics may be measured to determine whether the source is idle and the traffic is generated by a non-human user.

For example, a bot typically connects to only a small number of domains. Thus, if the number of connections made to unique domains (i.e., "unique domain count") exceeds a configurable threshold value Y at 415, the activity may be indicative of legitimate user (i.e. human) activity. The source may be removed from the tracked list and added to an ignored list (e.g., ignored list 240) at 420 with a time-to-live (TTL) of T1. If the unique domain count does not exceed Y at 415, the activity may be indicative of malware or system-generated activity.

An additional metric may include the total number of unique resource identifiers requested in a given domain, since a bot typically connects to only a small number of resources in the domain of a command and control server. However, some bots may attempt to conceal this behavior by varying parameters in an identifier, such as in a URI or URL. In certain embodiments, such a tactic may be countered by calculating a hash value (e.g., a "URI hash") for each resource identifier after removing parameter values. Thus, for each unique domain at 425 to which a source connected, a URI hash may be calculated at 430. If the number of unique URI hashes is below a threshold value Z at 435, the source may be added to a gray list (e.g., gray list 250) at 440 for further inspection. If the number of unique URI hashes is not less than the threshold value Z, the activity may be indicative of a legitimate process (e.g., a script), and the source may be removed from the tracked list and added to an ignored list (e.g., ignored list 240) at 420 with a TTL of T2.

The threshold values X, Y, and Z are generally configurable, but may be selected to tune sensitivity. For example, increasing the value of X should decrease false alarms, but also reduces sensitivity. Threshold values of $X \geq 10$, $1 \leq Y \leq 5$, and $1 \leq Z \leq 5$, respectively, may be appropriate in many embodiments. TTL values T1 and T2 may also be configurable, but values of one hour and four hours, respectively, may be appropriate in many embodiments.

Figure 5:
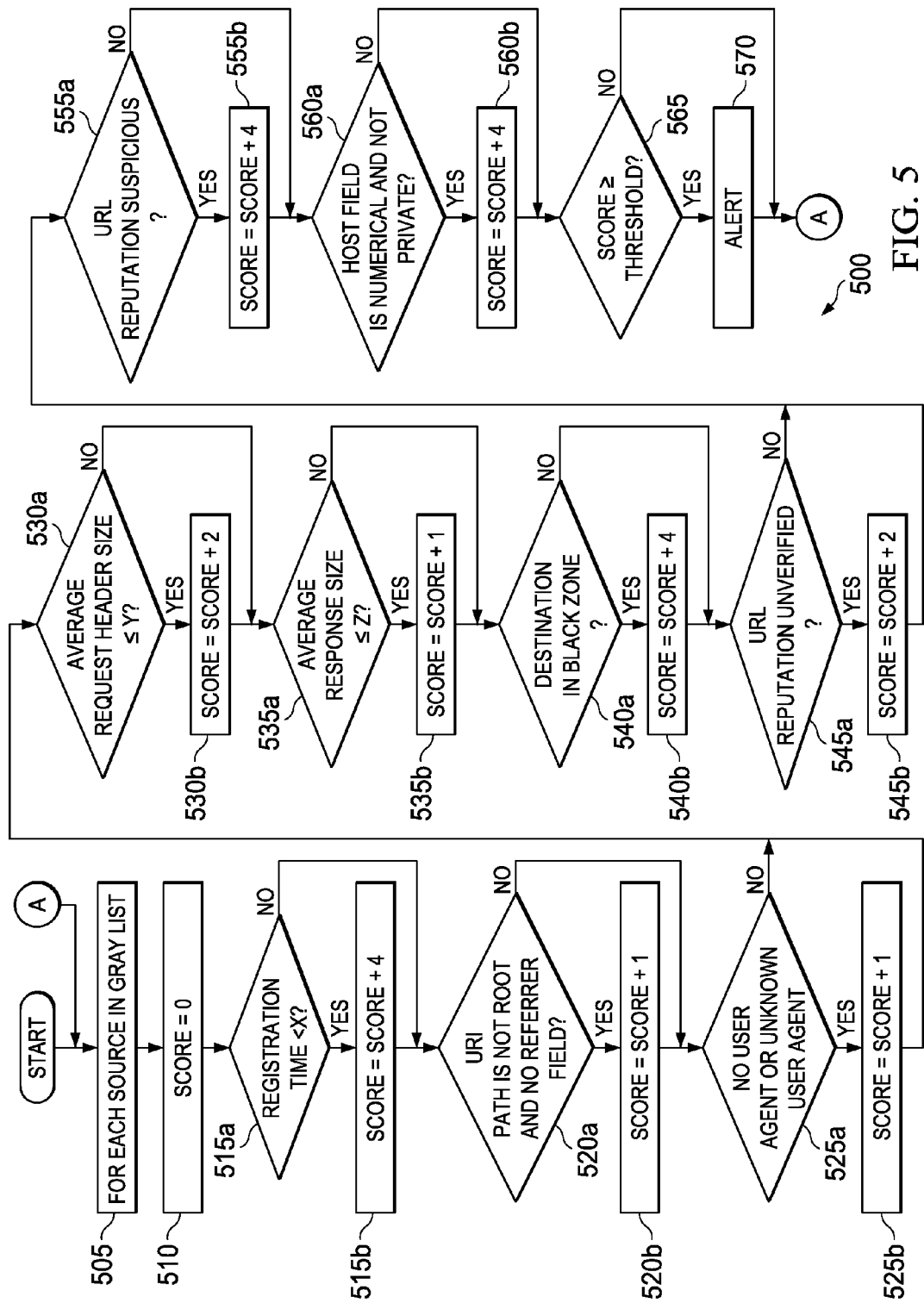
FIG. 5 is a simplified flowchart illustrating yet other operations that may be associated with the network environment.

FIG. 5 is a simplified flowchart 500 illustrating potential operations that may be associated with certain embodiments of network environment 100. In some embodiments, such operations may be implemented by sensor 120 (e.g., botnet detection module, including connection monitor 215, behavior analysis module 220, scoring engine 225, etc.). The operations may include heuristics used to score suspicious activities of a source, such as the activities of a source added to a gray list in flowchart 400, and thereby further increase the confidence level and reduce false positives.

In the example operations of FIG. 5, the scoring system may be based on a numerical scale, such as 0-8, in which a score of 2, 4, and 8 corresponds to a low, medium, and high confidence level, respectively. Thus, a high score of 8 or more may indicate almost no false-positives, a medium score of 4-7 may imply a possibility of some false positives and higher sensitivity, while a low score of 3 or less can imply audit level sensitivity (i.e., highly sensitive and prone to false positives). An additive scheme (e.g., low+low=medium and medium+medium=high) may be used in such an embodiment, such that three sensitivity/confidence levels (e.g., low<4, medium=4-7, and high≥8) are available.

Thus, in FIG. 5, each source in a gray list (e.g., gray list 250) may be identified at 505. The activities of each source in the gray list may be scored using certain heuristics. The score for each source may be initially set to 0 at 510. The heuristics are generally highly configurable and dynamic, but may include, for example, determining if the source connected to a recently registered domain at 515*a*, since it is common for a bot operator to use recently registered domains (e.g., within a time period of a few days to a year). Thus, using a 0-8 scoring system described above, the score may be increased by 4 points at 515*b* if the domain's registration time is less than a threshold value X, where the registration time may be determined by querying the WHOIS database, for example, and the threshold value X is configurable to adjust heuristic sensitivity. A value of six months for X may be appropriate in many embodiments.

The contents of a packet (or packets) may also be indicative of bot behavior. For example, HTTP requests and responses generally include header fields, such as a referrer field and a user-agent field. A referrer field may indicate the address of a previous resource from which a request originated, such as a web page that links to another resource. It is unusual for a browser to go to a non-root resource directly unless it is hard-coded (e.g., in a script or bot) or redirected from another resource. Consequently, the referrer field in a packet from a bot to a not-root resource is frequently missing or empty, and the score may be increased by 1-2 points at 520*b* if the referrer field in a packet is missing and the requested URI is not a root directory at 520*a*. A user-agent field is used by many legitimate clients to identify themselves. Conversely, a user-agent field is frequently missing or unknown in requests sent by bots, and the score may be increased by another 1-2 points at 525*b* if the user-agent field is missing or unknown at 525*a*. The number of header fields may also distinguish some malicious traffic from legitimate traffic. In HTTP, for example, header fields are generally terminated by a carriage return/line feed, so the number of header fields can be counted by counting the number of header lines. A bot that uses HTTP typically does not include many header fields, usually significantly fewer than legitimate clients. A score can be increased by yet another 1-2 points at 530*b* if at 530*a* the average number of request header lines is less than or equal to a threshold value Y, where Y is a configurable parameter. A value of 5 may be an appropriate value for Y in many embodiments. Bots frequently send keep-alive messages with near empty response pages that are quite unlike large web pages returned by normal web sites (which are typically greater than 1 kB), thus the score can also be increased by 1-2 points at 535*b* if the average body size of responses is smaller than a configurable threshold value Z (e.g., <100 bytes).

Reputation of a destination node can also significantly affect a score. Thus, a query may be sent to a reputation system, and the score can be adjusted accordingly based on the response from the reputation system. For example, if the destination is associated with a top-level domain that is in a zone with a bad reputation at 540*a*, such as .cn or .ru domains pointing to Chinese or Russian sites that might be unusual in North America, then a score can be increased by 4 points at 540*b*. If the address or domain of the destination is unverified at 545*a*, the score may be increased by 2 points at 545*b*. Similarly, if the address or domain of the destination is associated with a suspicious reputation at 555*a*, the score can be increased by 4 points at 555*b*. If the reputation of the address or domain is bad, then a repetitive HTTP connection while source is idle is almost certainly indicative of malicious bot activity and the score can be increased by 8 points. If the host field is a public network address (i.e., numerical and not private (e.g., 172.16.x/192.16.x/10.x/127.x)) at 560*a*, then the score may again be increased by 2-4 points at 560*b*.

If the score exceeds a configurable threshold value at 565, such as 4 or 8 in the example embodiment of FIG. 5, an appropriate action based on policy may be taken at 570. For example, appropriate action may include blocking new connections from the source or to the destination, recording the activity in a log for subsequent forensic analysis, or alerting an operator or administrator.

Scores for each heuristic and threshold levels are highly configurable, as is the scoring scale. Some heuristics may be removed where appropriate, and others may be added without departing from the scope of teachings provided herein. Parameters used in such heuristics may also be modified for a particular environment. For example, if a numerical address is commonly used in the host field in a given environment, then the score for a related heuristic can be reduced to 0 (i.e., eliminate the heuristic). Additionally, although illustrated with reference to particular protocols, the principles described herein may be readily adapted to detect command and control channels that may use other protocols.

Network environment 100 may provide significant advantages, some of which have already been discussed. For example, network environment 100 can provide near real-time detection of 0-day bots (i.e., bots not previously deployed) and APTs with high detection rates (including stealth bot detection with low activity), while substantially reducing or eliminating false positives. Moreover, network environment 100 is proactive and does not require signatures, with a behavioral approach that does not require frequent updates or maintenance. Network environment 100 is also highly configurable, but provides strong default parameters that do not require complex configuration.

In the examples provided above, as well as numerous other potential examples, interaction may be described in terms of two, three, or four network elements. However, this has been done for purposes of clarity and example only. In certain cases, it may be easier to describe one or more of the functionalities of a given set of operations by only referencing a limited number of network elements. It should be appreciated that network environment 100 is readily scalable and can accommodate a large number of components, as well as more complicated/sophisticated arrangements and configurations. Accordingly, the examples provided should not limit the scope or inhibit the broad teachings of network environment 100 as potentially applied to a myriad of other architectures. Additionally, although described with reference to particular scenarios, where a particular module is provided within a network element, these modules can be provided externally, or consolidated and/or combined in any suitable fashion. In certain instances, such modules may be provided in a single proprietary unit.

It is also important to note that steps in the appended diagrams illustrate only some of the possible scenarios and patterns that may be executed by, or within, network environment 100. Some of these steps may be deleted or removed where appropriate, or these steps may be modified or changed considerably without departing from the scope of teachings provided herein. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided in that any suitable arrangements, chronologies, configurations, and timing mechanisms may be provided without departing from the teachings provided herein.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   detecting repetitive connections within a predetermined time period from a source node to a destination node;
   determining the source node is idle and the repetitive connections indicate suspect activity, wherein the determining includes:
      determining the repetitive connections include more than a threshold value X of resource identifiers requested by the source node, wherein the threshold value X is selected to indicate a minimum number of connections sufficient for determining whether the source node is idle;
      determining the repetitive connections include less than a threshold value Y of unique domain names; and
      determining the repetitive connections include less than a threshold value Z of unique resource identifiers associated with at least one of the unique domain names,
      wherein the threshold values X, Y and Z are numerical values selected to be indicative of a pattern consistent with connections not generated by a human user;
   calculating a score for the idle source node based on behavior of the repetitive connections during the predetermined time period; and
   taking a policy action if the score exceeds a threshold value.

2. The method of claim 1, wherein the repetitive connections use a hypertext transfer protocol.

3. The method of claim 1, wherein calculating the score comprises using heuristics to identify behavior indicative of a threat.

4. The method of claim 1, wherein calculating the score comprises using heuristics to identify behavior indicative of a bot command and control channel.

5. The method of claim 1, wherein calculating the score comprises increasing the score if the destination node is associated with a domain registered within a year.

6. The method of claim 1, wherein calculating the score comprises increasing the score if at least one of the repetitive connections does not have a referrer field and does not have a root resource identifier.

7. The method of claim 1, wherein calculating the score comprises increasing the score if at least one of the repetitive connections does not identify a known user agent.

8. The method of claim 1, wherein calculating the score comprises increasing the score if at least one of the repetitive connections identifies the destination node by a public network address.

9. The method of claim 1, wherein calculating the score comprises increasing the score if the repetitive connections have less than an average number of request header lines, wherein the average number is a parameter indicative of a malware connection to the destination node.

10. The method of claim 1, wherein calculating the score comprises increasing the score if the repetitive connections have less than an average response size, wherein the average response size is a parameter indicative of responses from a command and control server.

11. The method of claim 1, wherein calculating the score comprises requesting a reputation value associated with the destination node and increasing the score if the reputation value indicates the destination node is associated with a threat.

12. The method of claim 1, wherein calculating the score comprises increasing the score if the destination node has a network address in a zone associated with a threat.

13. At least one non-transitory computer readable medium having instructions stored therein and when executed, the instructions cause one or more processors to:
   detect repetitive connections within a predetermined time period from a source node to a destination node;
   determine the source node is idle and the repetitive connections indicate suspect activity, wherein the determination is made by:
      determining the repetitive connections include more than a threshold value X of resource identifiers requested by the source node, wherein the threshold value X is selected to indicate a minimum number of connections sufficient for determining whether the source node is idle;
      determining the repetitive connections include less than a threshold value Y of unique network addresses; and
      determining the repetitive connections include less than a threshold value Z of unique resource identifiers associated with at least one of the unique network addresses,
      wherein the threshold values X, Y, and Z are numerical values selected to be indicative of a pattern consistent with connections not generated by a human user;
   calculate a score for the idle source node based on behavior of the repetitive connections during the predetermined time period; and
   take a policy action if the score exceeds a threshold value.

14. The at least one non-transitory computer readable medium of claim 13, wherein the repetitive connections use a hypertext transfer protocol.

15. The at least one non-transitory computer readable medium of claim 13, wherein calculating the score comprises using heuristics to identify behavior indicative of the threat.

16. The method at least one non-transitory computer readable medium of claim 13, wherein:
   the threat is a bot connecting to a command and control server using a hypertext transfer protocol;

X is greater than or equal to 10, Y is less than or equal to 5, and Z is less than or equal to 5;

the time period is at least eight hours;

calculating the score comprises using heuristics to identify behavior indicative of the threat; and the policy action is sending an alert to an administrator.

17. The at least one non-transitory computer readable medium of claim 13, wherein calculating the score comprises increasing the score if at least one of the repetitive connections does not have a referrer field and does not have a root resource identifier.

18. The at least one non-transitory computer readable medium of claim 13, wherein calculating the score comprises increasing the score if at least one of the repetitive connections does not identify a known user agent.

19. The at least one non-transitory computer readable medium of claim 13, wherein calculating the score comprises increasing the score if at least one of the repetitive connections identifies the destination node by a public network address.

20. The at least one non-transitory computer readable medium of claim 13, wherein calculating the score comprises increasing the score if the repetitive connections have less than an average number of request header lines, wherein the average number is a parameter indicative of a malware connection to the destination node.

21. The at least one non-transitory computer readable medium of claim 13, wherein calculating the score comprises increasing the score if the repetitive connections have less than an average response size, wherein the average response size is a parameter indicative of responses from a command and control server.

22. The at least one non-transitory computer readable medium of claim 13, wherein calculating the score comprises requesting a reputation value associated with the destination node and increasing the score if the reputation value indicates the destination node is associated with a threat.

23. The at least one non-transitory computer readable medium of claim 13, wherein calculating the score comprises increasing the score if the destination node has a network address in a zone associated with a threat.

* * * * *

UNITED STATES PATENT AND TRADEMARK OFFICE
CERTIFICATE OF CORRECTION

PATENT NO. : 8,677,487 B2
APPLICATION NO. : 13/276244
DATED : March 18, 2014
INVENTOR(S) : Ravindra Balupari et al.

Page 1 of 1

It is certified that error appears in the above-identified patent and that said Letters Patent is hereby corrected as shown below:

In the Claims

In column 12, line 64, in claim 16, after "The" delete "method".

Signed and Sealed this
Twenty-second Day of July, 2014

Michelle K. Lee
*Deputy Director of the United States Patent and Trademark Office*